(12) United States Patent
Lee

(10) Patent No.: US 12,461,217 B2
(45) Date of Patent: Nov. 4, 2025

(54) SYSTEM FOR CHANGING ULTRASONIC SENSOR THRESHOLD VALUE ACCORDING TO VEHICLE HEIGHT ON BASIS OF GROUND WAVE MODEL

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 536 days.

(21) Appl. No.: 17/592,057

(22) Filed: Feb. 3, 2022

(65) Prior Publication Data

US 2022/0244364 A1  Aug. 4, 2022

(30) Foreign Application Priority Data

Feb. 3, 2021 (KR) .................. 10-2021-0015737

(51) Int. Cl.
 *G01S 7/52* (2006.01)
 *G01S 7/527* (2006.01)
 *G01S 15/931* (2020.01)

(52) U.S. Cl.
 CPC .......... *G01S 7/5273* (2013.01); *G01S 15/931* (2013.01); *G01S 2015/932* (2013.01); *G01S 2015/938* (2013.01)

(58) Field of Classification Search
 CPC .. G01S 7/5273; G01S 7/52004; G01S 15/931; G01S 15/04; G01S 2015/932;
 (Continued)

(56) References Cited

U.S. PATENT DOCUMENTS 3,719,921 A * 3/1973 Jean ................. G01S 15/60
 342/135
4,847,591 A * 7/1989 Ota ................... B60R 16/0232
 701/1

(Continued)

FOREIGN PATENT DOCUMENTS

CN 207182032 U * 4/2018 .............. A01M 7/00
JP 08278368 A * 10/1996 ............. B60R 21/00
(Continued)

*Primary Examiner* — Catherine T. Rastovski
*Assistant Examiner* — Lal Ce Mang
(74) *Attorney, Agent, or Firm* — NovoTechIP International PLLC

(57) ABSTRACT

Provided is a system for adjusting an ultrasonic sensor threshold value according to a vehicle height on the basis of a ground wave model. The system includes a vehicle height detection unit configured to detect a vehicle height, a ground wave modeling unit configured to model a ground wave model by matching a ground waveform start delay time and a threshold value for each vehicle height detected by the vehicle height detection unit and provide the modeled ground wave model, and an ultrasonic sensor configured to store the ground wave model and a ground waveform reference threshold value measured at a lowest vehicle height of a vehicle and compensate a lowest vehicle height threshold value according to the current vehicle height using a ground waveform start delay time calculated according to the detected vehicle height.

13 Claims, 6 Drawing Sheets

(58) Field of Classification Search
CPC .............. B60G 17/0155; B60G 17/019; B60G 2400/252; B60G 2400/823; B60G 2401/176; B60G 2500/30; B60R 21/0134
See application file for complete search history.

(56) References Cited

U.S. PATENT DOCUMENTS

| 9,477,894 | B1 * | 10/2016 | Reed ..................... G06V 20/586 |
| 2010/0049413 | A1 * | 2/2010 | Makino ............... B60W 30/188 |
| | | | 701/65 |
| 2013/0110346 | A1 * | 5/2013 | Huber .................... G08G 1/165 |
| | | | 701/33.9 |
| 2017/0242122 | A1 * | 8/2017 | Suzuki .................. G01S 15/931 |

FOREIGN PATENT DOCUMENTS

| KR | 100348041 B1 * | 8/2002 | ............... B60Q 5/00 |
| KR | 20160066293 A * | 6/2016 | ......... B60G 17/0155 |
| KR | 10-2020-0059475 A | 5/2020 | |
| KR | 20200059475 A * | 5/2020 | ................ B60T 7/22 |

* cited by examiner

SYSTEM FOR CHANGING ULTRASONIC SENSOR THRESHOLD VALUE ACCORDING TO VEHICLE HEIGHT ON BASIS OF GROUND WAVE MODEL

CROSS-REFERENCE TO RELATED APPLICATIONS

This application claims priority to and the benefit of Korean Patent Application No. 10-2021-0015737, filed on Feb. 3, 2021, the disclosure of which is incorporated herein by reference in its entirety.

BACKGROUND

1. Technical Field

The present invention relates to a system for changing an ultrasonic sensor threshold value, and more particularly, to a system for changing an ultrasonic sensor threshold value according to a vehicle height on the basis of a ground wave model.

2. Discussion of Related Art

Typical automotive ultrasonic sensors use a threshold value curve to distinguish a ground-reflected wave from an obstacle.

As shown in FIG. 1, the threshold value curve of a typical ultrasonic sensor can be expressed using a pair of time and voltage, and 32 or more samples are used in order to express a distance threshold value of at least 4.5 m in detail.

Meanwhile, in a smart parking assistance system (referred to as "SPAS"), 12 different threshold values are used because 12 ultrasonic sensors are mounted on the vehicle at different heights, so in order to increase the accuracy of the ultrasonic sensors, the compensation for the ultrasonic sensors should be performed.

In this case, according to a conventional method of compensating for an ultrasonic sensor based on a vehicle height sensor, a ground waveform corresponding to a change in the vehicle height sensor is compensated for by changing a threshold value or a receiving sensitivity.

In addition, Korean Patent No. KR 10-0348041 B1 entitled "METHOD FOR INSPECTING BACKWARD HINDRANCE OF AUTOMOBILE" and Japanese Patent Laid-open Publication No. JP 1996-278368 A entitled "OBSTACLE DETECTION DEVICE", all disclose a correction unit configured to selectively apply threshold values found through experiments according to a vehicle height sensor input.

However, the threshold value correction using experimental values requires a six-fold increase in threshold value storage space of a sensor when the vehicle height is configured to have six steps.

In this case, the price increases because the threshold value space requires 384 bytes [32 EA (number of threshold value samples)×2 (time, voltage)×6 EA (number of height division steps)].

Also, in the case of a structure in which a controller stores threshold values and initializes ultrasonic sensors, a central controller requires a six-fold increase in storage space and thus requires 4,608 bytes. Thus, the price of the sensors can be maintained while the price of the controller rises due to an additional memory.

Also, when the sensor is initialized using a communication method with a transmission rate of 19,200 bits/sec, such as Local Interconnect Network (LIN), it takes 160 ms (384 bytes×8 bits/byte/19200 bits/sec) to update the threshold values.

A short-range ultrasonic sensor provides the presence or absence of obstacles every 60 ms but cannot perform detection three times when the vehicle height is changed after starting.

Also, since the height compensation is performed in each step rather than continuously, a higher threshold value is used than in an optimal height compensation state, and thus the detection distance is shortened.

SUMMARY

The present invention is to solve the problems of the prior art and is directed to providing a system for changing an ultrasonic sensor threshold value according to a vehicle height on the basis of a ground wave model capable of setting a threshold value at a predetermined vehicle height, modeling a change in ground wave according to a change in vehicle height, estimating the start time of the ground wave and the magnitude of the ground wave with time, and providing a final threshold value.

The technical objects of the present invention are not limited to those described above, and other technical objects that are not described herein will be apparently understood by those skilled in the art from the following description.

According to an aspect of the present invention, there is provided a system for changing an ultrasonic sensor threshold value according to a vehicle height on the basis of a ground wave model, the system including a vehicle height detection unit configured to detect a vehicle height, a ground wave modeling unit configured to model a ground wave model by matching a ground waveform start delay time and a threshold value for each vehicle height detected by the vehicle height detection unit, and a threshold value correction unit configured to store a ground waveform reference threshold value measured at a lowest vehicle height of a vehicle and compensate a lowest vehicle height threshold value according to the current vehicle height using a ground waveform start delay time calculated according to the detected vehicle height.

The vehicle height detection unit may calculate the vehicle height by count backward_a vehicle height variation that occurs according to a pressure value of an air suspension and vehicle height information set when the vehicle is released.

The ground wave modeling unit may calculate a starting point of a waveform reflected from a ground, which is for the shortest route between the ground and the ultrasonic sensor, calculate a ground waveform start delay time_(td) by subtracting the lowest vehicle height from the current vehicle height (H) and then dividing a result of the subtraction by an ultrasonic speed and a beam angle of the ultrasonic sensor, and model a ground wave on the basis of a vehicle ground by calculating a change in signal magnitude according to an increase in vehicle height when a ground waveform is measured when the vehicle is at a lowest ground height (Hmin).

The threshold value correction unit may calculate the ground waveform start delay time (td) by subtracting the lowest vehicle height from the current vehicle height (H) and dividing a result of the subtraction by the ultrasonic speed and the beam angle of the ultrasonic sensor, calculate a ground signal variation, which is a result obtained by dividing the square of the lowest ground height (Hmin) by the square of the current vehicle height (H), delay the threshold value at the lowest vehicle height (Hmin) stored in the ultrasonic sensor by the calculated delay time (td), and calculate a final threshold value by multiplying the delayed lowest vehicle height threshold value by the calculated ground signal variation.

The system may further include a controller configured to, when the final threshold value is calculated at the lowest vehicle height, deliver the calculated final threshold value to each ultrasonic sensor in a broadcasting manner.

When a process for compensating a threshold value for a vehicle height begins, the ultrasonic sensor may receive the vehicle height detected by a vehicle height sensor from a controller in a broadcasting manner, correct the threshold value according to the vehicle height on the basis of the ground wave model and the calculated final threshold value at the lowest vehicle height, detect an obstacle using the corrected threshold value, and then transmit distance information of the obstacle, which is a result of the detection, to the controller.

DETAILED DESCRIPTION

Advantages and features of the present invention and implementation methods thereof will be clarified through the following embodiments described in detail with reference to the accompanying drawings. However, the present invention is not limited to embodiments disclosed herein and may be implemented in various different forms. The embodiments are provided for making the disclosure of the present invention thorough and for fully conveying the scope of the present invention to those skilled in the art. It is to be noted that the scope of the present invention is defined by the claims. The terminology used herein is for the purpose of describing particular embodiments only and is not intended to be limiting of the invention. Herein, the singular shall be construed to include the plural, unless the context clearly indicates otherwise. The terms "comprises" and/or "comprising" used herein specify the presence of stated elements, steps, operations, and/or components, but do not preclude the presence or addition of one or more other elements, steps, operations, and/or components.

Figure 1:
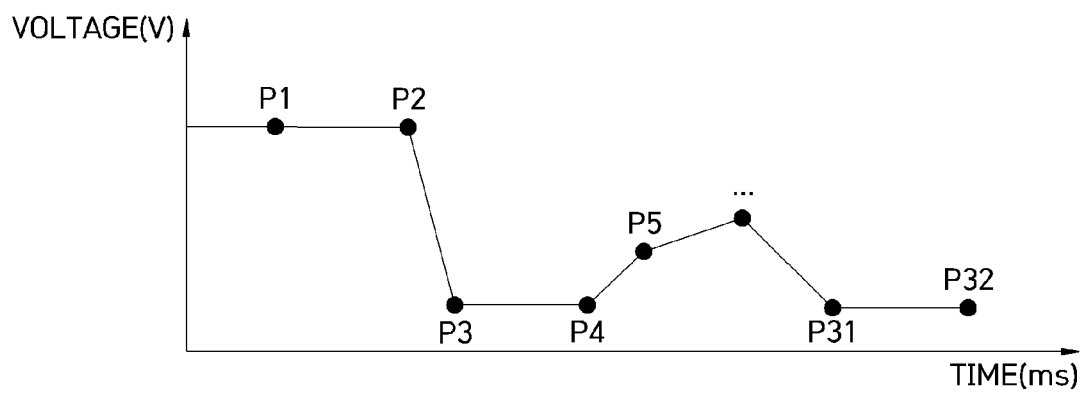
FIG. 1 is a graph illustrating a threshold value curve of a typical ultrasonic sensor.
Figure 2:
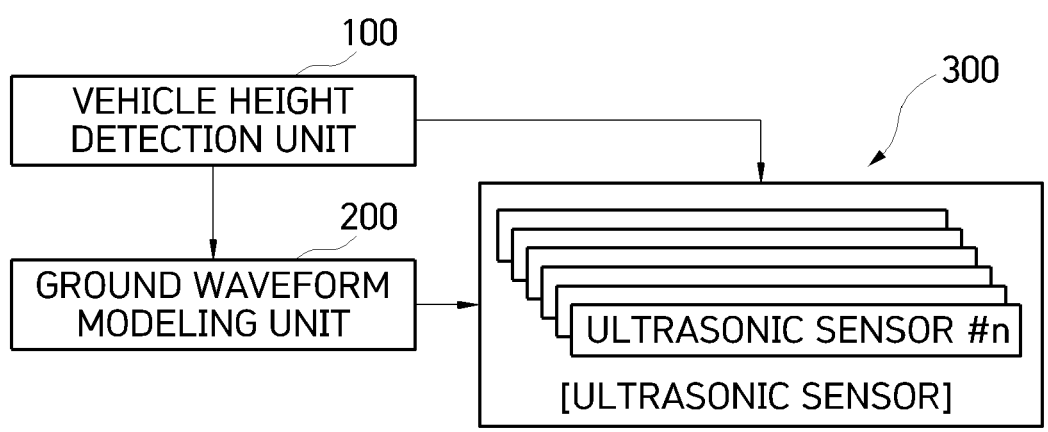
FIG. 2 is a block diagram illustrating a system for changing an ultrasonic sensor threshold value according to a vehicle height on the basis of a ground wave model according to an embodiment of the present invention.

FIG. 2 is a block diagram illustrating a system for changing or adjusting an ultrasonic sensor threshold value according to a vehicle height on the basis of a ground wave model according to the present invention.

As shown in FIG. 2, the system for changing the ultrasonic sensor threshold value according to the vehicle height on the basis of the ground wave model includes a vehicle height detection unit 100, a ground wave modeling unit 200, and a threshold value correction unit 320.

The vehicle height detection unit 100 detects vehicle height information and provides the detected vehicle height information to the ground wave modeling unit 200 and a control unit. The vehicle height detection unit 100 may calculate the vehicle height by count backward a vehicle height variation that occurs according to a pressure value of an air suspension and vehicle height information set when the vehicle is released. In one embodiment of the present invention, it has been described that the vehicle height is calculated using the air suspension of the vehicle, but the present invention is not limited thereto. The vehicle height may also be calculated through an image captured through a separate ultrasonic sensor or camera for detecting the vehicle height.

The ground wave modeling unit 200 generates a ground wave model by calculating a ground waveform on the basis of the vehicle height detected by the vehicle height detection unit 100. Preferably, the ground wave model in this embodiment is modeled by performing matching with matching information between a threshold value and a ground waveform start time according to the vehicle height.

However, the ultrasonic sensor 300 has characteristics in which the largest energy is transferred on an extension line of the center of the sensor installed in the vehicle and in which the energy decreases in a direction away from the center.

Figure 3:
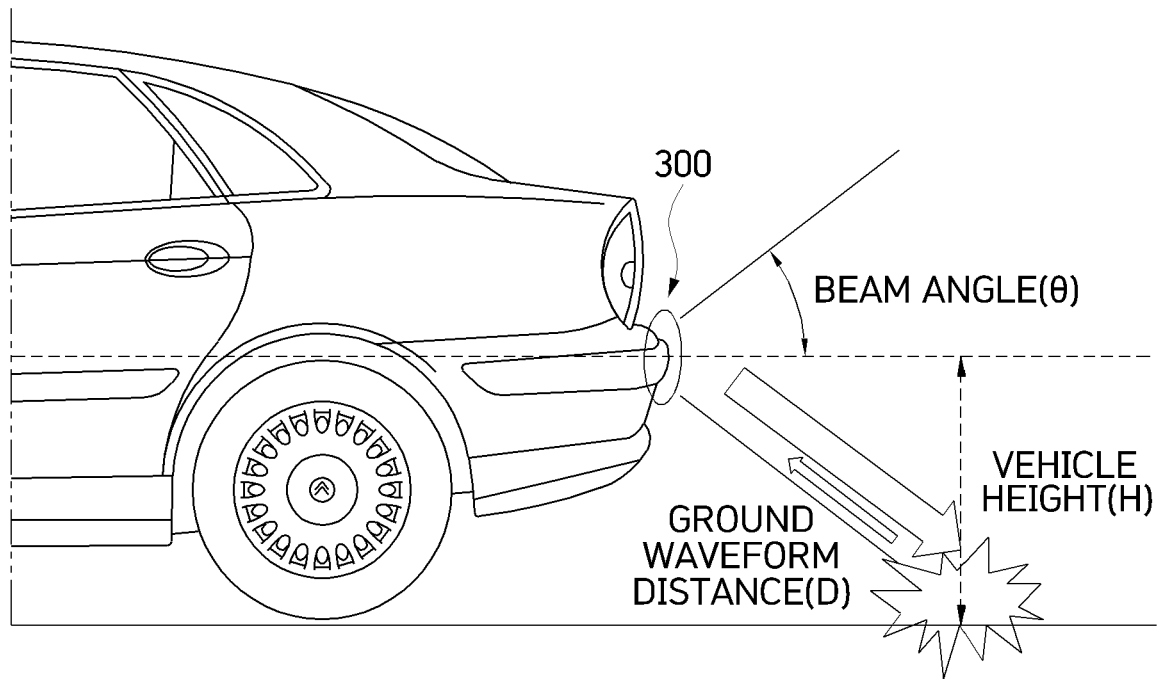
FIG. 3 is a reference diagram illustrating a starting point of a ground waveform distance of an ultrasonic sensor.

As shown in FIG. 3, in the case of the ultrasonic sensor 300, an angle at which a signal is half the maximum refers to a beam angle, and most of the energy is distributed in space within this angle.

Meanwhile, the starting point of the waveform reflected from a ground may be calculated through the ultrasonic sensor 300. That is, since a boundary point between the presence and the absence of transmission energy from the ultrasonic sensor 300 can be regarded as a beam angle, the starting distance of the ground-reflected waveform may be calculated using Equation 1 below.

Equation 1

$$D = H/\sin(\theta_b)$$

where D is a ground wave distance, H is a vehicle height, and $\theta_b$ is a beam angle.

Subsequently, the start time of the ground-reflected waveform of the ultrasonic sensor 300 is calculated through Equation 2 below.

Equation 2

$$\text{Ground Waveform Start Time} = 2D/c$$

where D is a distance at which the ground waveform starts, and c is the speed of ultrasonic waves in the air (340 m/s).

In the case of a ground waveform measured when a vehicle is at the lowest ground height $H_{min}$, the delay of the start time corresponding to a change in the vehicle height H may be calculated using Equation 3 below.

Equation 3

Ground waveform start delay time=$2(H-H_{min})/c\sin(\theta_b)$ where H is a vehicle height, $\theta_b$ is a beam angle, and c is the speed of ultrasonic waves in the air (340 m/s).

Therefore, as the height of the ground waveform increases (H ↑), the distance between the sensor and the ground waveform also increases, and the magnitude of the ultrasonic signal decreases in inverse proportion to the square of the distance.

In the case of a ground waveform measured when a vehicle is at the lowest ground height $H_{min}$, a change in signal magnitude corresponding to an increase in vehicle height may be calculated using Equation 4 below.

$$\frac{H^2/\sin^2(\theta_b)}{H_{min}^2/\sin^2(\theta_b)} = \frac{H_{min}^2}{H^2} \quad [\text{Equation 4}]$$

Accordingly, the ultrasonic sensor 300 corrects the threshold value of the ultrasonic sensor using a ground wave model modeled by the ground wave modeling unit 200 and vehicle height information detected through the vehicle height detection unit 100.

Figure 6:
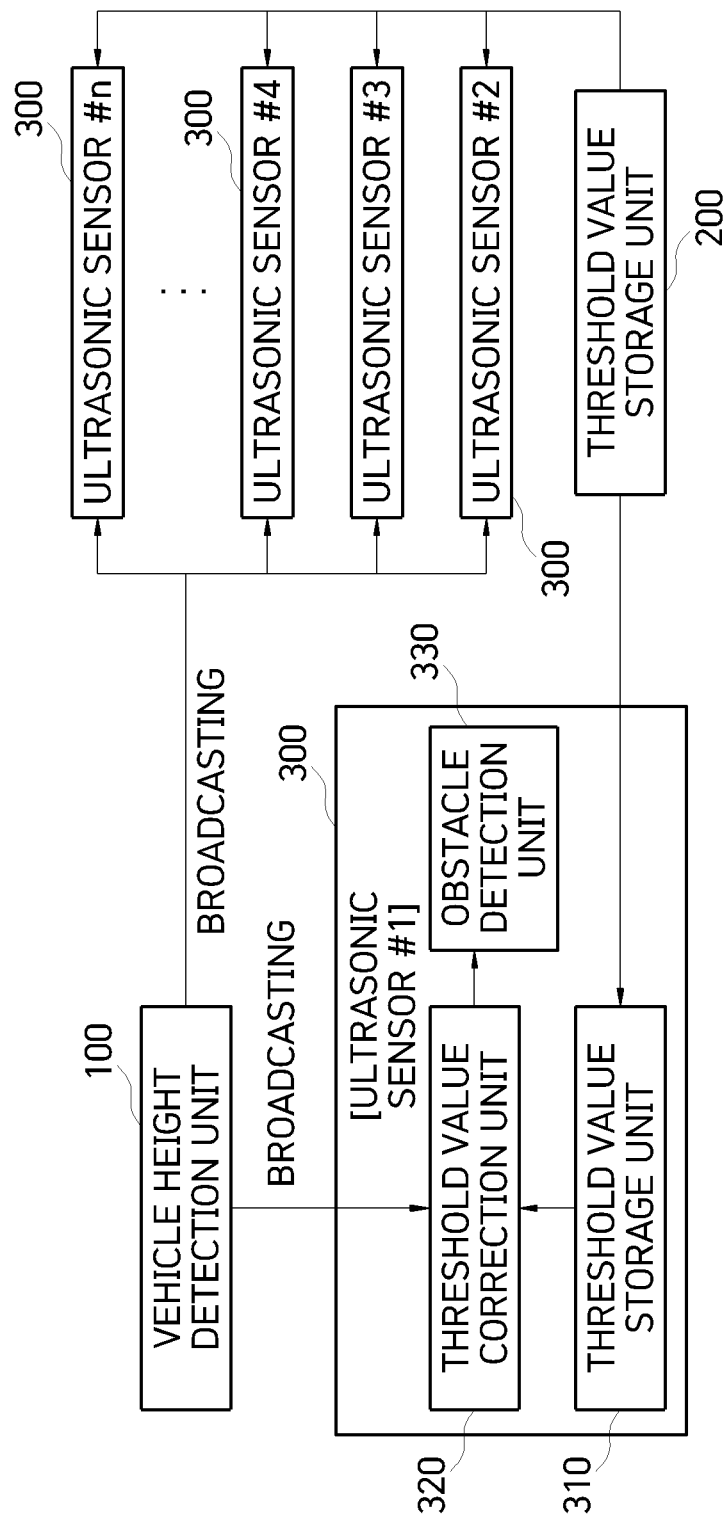
FIG. 6 is a block diagram illustrating a configuration of an ultrasonic sensor according to an embodiment of the present invention.

To this end, the ultrasonic sensor 300 includes a threshold value storage unit 310, a threshold value correction unit 320, and an obstacle detection unit 330, as shown in FIG. 6.

The threshold value storage unit 310 stores the ground wave model and the lowest vehicle height threshold value delivered by the ultrasonic sensor 300.

The threshold value correction unit 320 corrects the threshold values using the stored lowest vehicle height threshold value and the ground wave model and the vehicle height information (1 byte) delivered from the vehicle height detection unit 100 in a broadcast manner.

The threshold value correction unit 320 of the present invention will be described in more detail below.

First, when the vehicle has the lowest ground height, the threshold value correction unit 320 generates a threshold value on the basis of the measured ground waveform in order to prevent a false alarm, and then compensates the threshold value as a final threshold value suitable for the current vehicle height by using the lowest vehicle height threshold value and Equation 3 and Equation 4.

Meanwhile, the threshold value at the lowest ground height $H_{min}$ is stored and generated by the ultrasonic sensor 300.

Figure 4:
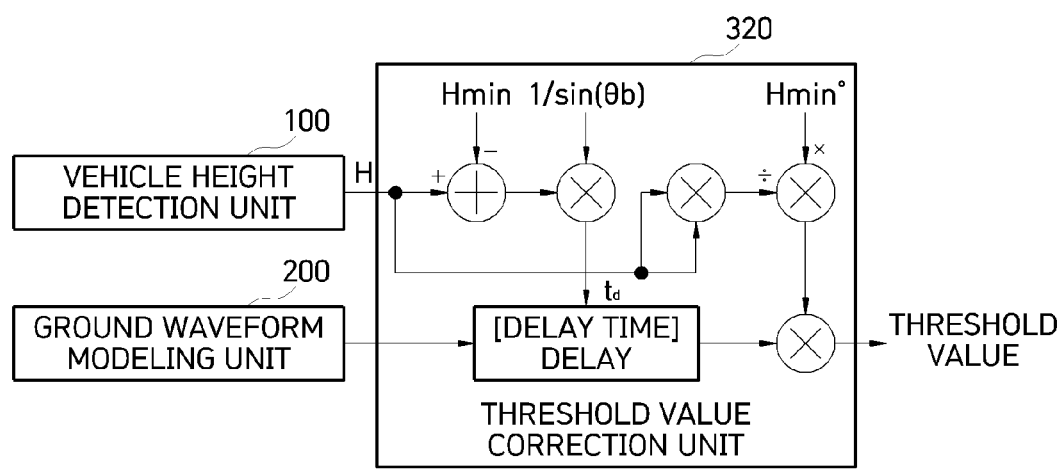
FIG. 4 is a block diagram illustrating a detailed configuration of a ground wave modeling unit of FIG. 2.

As shown in FIG. 4, the threshold value correction unit 320 calculates a ground signal variation, which is a result of Equation 4 obtained by dividing the square of the lowest ground height $H_{min}$ by the square of the vehicle height H.

The threshold value correction unit 320 detects a calculated delay time td by applying a value D obtained by subtracting the lowest vehicle height $H_{min}$ from the current vehicle height H to Equation 2 and then applies the result to Equation 3.

Thereafter, the threshold value correction unit 320 calculates a correction value obtained by multiplying the lowest vehicle height threshold value by the ground signal variation as the final threshold value of the ultrasonic sensor by using the calculated ground waveform start delay time.

Figure 5:
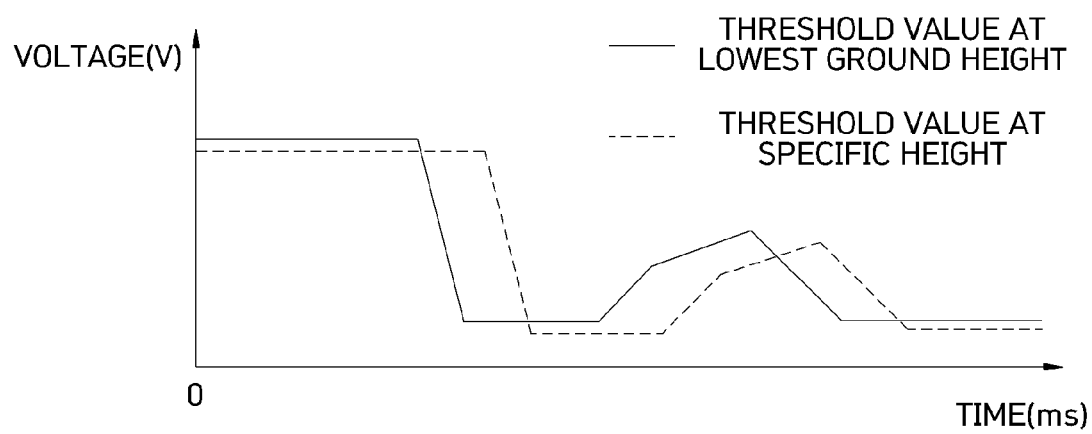
FIG. 5 is a graph that compares a threshold value at a specific vehicle height to a threshold value at the lowest vehicle height calculated through a ground wave modeling unit of FIG. 4.

As an example, it can be seen, as shown in FIG. 5, that the threshold value of the ultrasonic sensor at the lowest vehicle height and a threshold value at a specific height are different and have different ground waveform start times. Also, the ground wave model is obtained by modeling the ground waveform start time and the threshold value according to the vehicle height. Thus, when the vehicle height information is acquired, the threshold value correction unit 320 may detect a ground waveform start time through the vehicle height information and correct the threshold value of the ultrasonic sensor through the detection.

According to the corrected threshold value, the obstacle detection unit 330 detects an obstacle by transmitting ultrasonic waves to the obstacle and receiving reflected waves.

The ultrasonic sensor 300 detects an obstacle within the threshold corrected according to the vehicle height and provides distance information of the obstacle to a controller (not shown).

Thus, according to an embodiment of the present invention, it is possible to apply an optimal threshold value according to a change in vehicle height in real time.

According to an embodiment of the present invention, $\sin(\theta_b)$ and $H_{min}^2$ required for computation are constants, and an optimal threshold value generation process consists only of simple additions and multiplications. Thus, the amount of computation is small, so that it is possible to allow real-time calculation.

In an embodiment of the present invention, by delivering only vehicle height information with a relatively very small amount of data to an ultrasonic sensor in a broadcast manner rather than providing corrected threshold information to correct the threshold value of the ultrasonic sensor, it is possible for the ultrasonic sensor to correct the threshold values of the ultrasonic sensor using the height information and the ground wave model.

Figure 7:
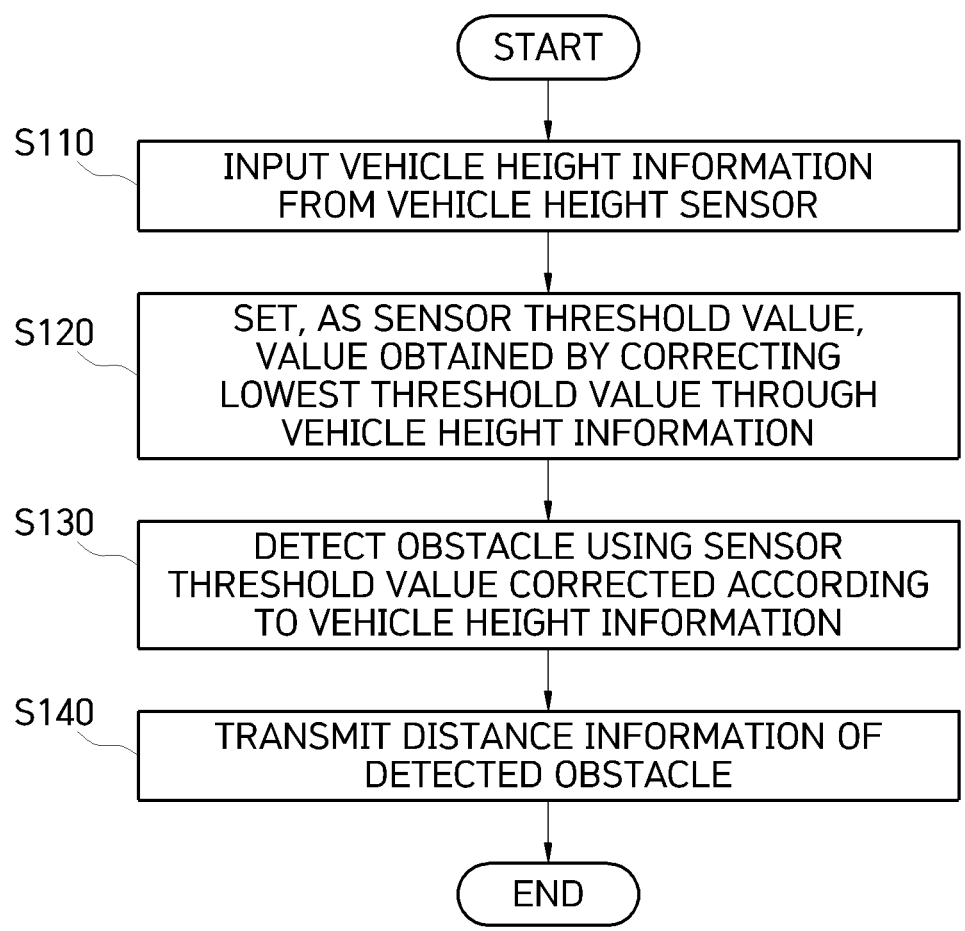
FIG. 7 is a flowchart illustrating a method in which an ultrasonic sensor corrects an ultrasonic threshold value with reference to vehicle height information and a ground wave model according to an embodiment of the present invention.

FIG. 7 is a flowchart illustrating a method in which an ultrasonic sensor corrects an ultrasonic threshold value with reference to vehicle height information and a ground wave model according to an embodiment of the present invention.

A method of changing or adjusting an ultrasonic sensor threshold value according to a vehicle height on the basis of a ground wave model according to an embodiment of the present invention will be described below with reference to FIG. 7.

When a process for compensating a threshold value for a vehicle height begins, an ultrasonic sensor 300 receives vehicle height information in a broadcast manner through a vehicle height detection unit 100 (S110).

Subsequently, the ultrasonic sensor 300 corrects the lowest vehicle height threshold value stored in a threshold value storage unit 310 using the vehicle height information provided from the vehicle height detection unit 100. The ultrasonic sensor 300 sets a corrected threshold value obtained by correcting the lowest vehicle height threshold value as a sensor threshold value (S120). That is, since the lowest vehicle height threshold value is stored in the threshold value storage unit 310 and the vehicle height information is provided from the vehicle height detection unit 100, the ultrasonic sensor 300 may set a sensor threshold value corresponding to the current vehicle height by detecting the difference between the lowest vehicle height and the current vehicle height and then applying the difference to a ground wave model.

Then, the ultrasonic sensor 300 detects an obstacle through the calculated sensor threshold value (S130).

Subsequently, the ultrasonic sensor 300 transmits distance information of the detected obstacle to a controller (S140).

According to an embodiment of the present invention, by using ground wave modeling for the vehicle height and receiving only vehicle height information, it is possible to apply, to an ultrasonic sensor, a threshold value by which compensation is performed on the vehicle height in real time.

Experimental results for compensation for the vehicle height based on the ground wave model, which is proposed through the system for changing the ultrasonic sensor threshold value according to the vehicle height on the basis of the ground wave model according to an embodiment of the present invention will be described below.

According to an embodiment of the present invention, it is possible to compensate for both continuous height and time axes.

However, in the case of the conventional method, in order to reduce the amount of memory used for the height compensation, sections are determined and the compensation is performed for each section.

Figure 8:
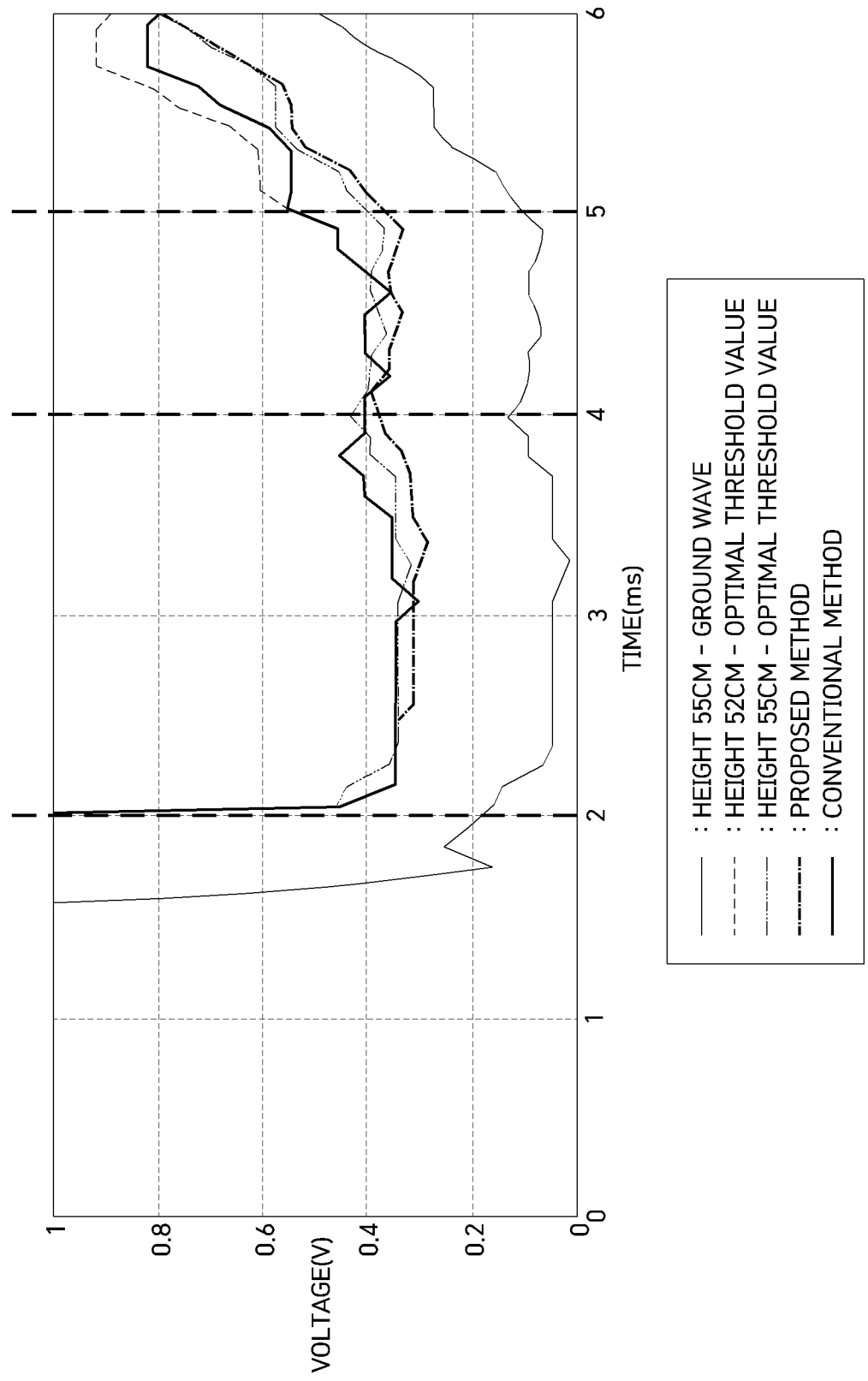
FIG. 8 is a reference diagram illustrating a comparison between threshold values of a conventional method and the present invention according to a change in vehicle height.

FIG. 8 is a graph comparing threshold values of the conventional method and the present invention according to a change in vehicle height (from 52 cm to 55 cm).

FIG. 8 shows the ground wave reference threshold value (ground wave+offset) when the lowest ground height of the vehicle is 52 cm and the threshold value when the height is 55 cm.

The ground waveform with a height of 55 cm is represented as a blue line, and the optimal threshold value obtained by adding an offset to this ground wave is red.

The conventional method is a result obtained by compensating the threshold value at a height of 52 cm for each section. According to an embodiment of the present invention, changes in the delay time and magnitude along with the change in vehicle height are applied using the ground wave model.

According to the conventional method, errors increase because only magnitude compensation is performed without considering delay at the start of the ground waveform. Accordingly, the root mean square (RMS) error between the optimal result and the conventional method, which is 0.0983, is greater than the difference between the optimal result and the present invention, which is 0.0841.

Therefore, according to the present invention, it can be seen that a more optimal threshold value is generated according to a vehicle height. Also, since the threshold value is smaller than in the conventional method, it is possible to increase the detection distance of the ultrasonic sensor 300.

According to an embodiment of the present invention, by modeling a change in ground wave corresponding to a change in vehicle height to set an optimal threshold value, it is possible to perform continuous compensation according to the change in vehicle height, and also it is possible to set an optimal (low) threshold value corresponding to height, thus increasing a detection distance.

Also, according to an embodiment of the present invention, unlike the conventional stepwise vehicle height compensation method, both a sensor and a controller do not use an additional memory, and thus an ASIC memory can be reduced. Accordingly, it is possible to reduce a system installation cost.

Also, according to an embodiment of the present invention, information that a controller needs to transmit to a sensor according to a change in vehicle height is only a vehicle height, and thus it takes very little time to transmit the changed vehicle height. Accordingly, it is possible to make compensation even when the vehicle height changes continuously.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The configuration of the present invention has been described above in detail with reference to the accompanying drawings, but this is only an example. It will be appreciated that those skilled in the art can make various modifications and changes within the scope of the technical spirit of the present invention. Therefore, the scope of the present invention should not be limited to the above-described embodiments and should be defined by the appended claims.

What is claimed is:

1. A system for detecting an obstacle, comprising:
a vehicle height detection unit configured to detect a vehicle height of a vehicle and transmit detected vehicle height information;
a ground wave modeling unit configured to generate a ground wave model by matching (1) a ground waveform start delay time determined based on the detected vehicle height and (2) a threshold value for the detected vehicle height; and
an ultrasonic sensor configured to:
receive the vehicle height information in a broadcast manner;
store the ground wave model and a ground waveform reference threshold value measured at a lowest vehicle height of the vehicle;
compensate a lowest vehicle height threshold value according to a current vehicle height using the received vehicle height information and the ground waveform start delay time;
increase accuracy of the ultrasonic sensor for detecting obstacles by correcting the threshold value for the detected vehicle height based on the ground wave model;
detect an obstacle using the corrected threshold value and generate distance information of the obstacle; and
transmit the distance information of the obstacle to a controller so as to help avoid collision with the obstacle.

2. The system of claim 1, wherein, to detect the vehicle height, the vehicle height detection unit is configured to count backward a vehicle height variation that occurs according to a pressure value of an air suspension and vehicle height information set when the vehicle is released.

3. The system of claim 1, wherein the ground wave modeling unit is configured to:
determine a starting point of a waveform reflected from a ground;
determine the ground waveform start delay time by (1) subtracting a lowest vehicle height from the current vehicle height and (2) dividing a result of the subtraction by an ultrasonic speed and a beam angle of the ultrasonic sensor; and
model a ground wave based on a vehicle ground by determining a change to a signal magnitude according to an increase in the vehicle height when a ground waveform is measured when the vehicle is at a lowest ground height.

4. The system of claim 1, wherein the ultrasonic sensor comprises:
a threshold value storage unit configured to store the ground wave model and the lowest vehicle height threshold value;
a threshold value correction unit configured to correct the threshold value for the detected vehicle height using the stored lowest vehicle height threshold value, the ground wave model and vehicle height information provided from the vehicle height detection unit; and
an obstacle detection unit configured to transmit an ultrasonic wave to an obstacle and receive a reflected ultrasonic wave to detect the obstacle according to the corrected threshold value.

5. The system of claim 4, wherein the threshold value correction unit is configured to:
determine a ground waveform start delay time by subtracting the lowest vehicle height from the current vehicle height and dividing a result of the subtraction by an ultrasonic speed and a beam angle of the ultrasonic sensor;
determine a ground signal variation by dividing a square of a lowest ground height by a square of the current vehicle height;
delay the lowest vehicle height threshold value by the determined delay time; and
determine a final threshold value of the ultrasonic sensor by multiplying the delayed lowest vehicle height threshold value by the determined ground signal variation.

6. The system of claim 1, further comprising a controller configured to, when a final threshold value is determined at the lowest vehicle height, provide the determined final threshold value to the ultrasonic sensor.

7. The system of claim 1, wherein the ultrasonic sensor is configured to receive the detected vehicle height from a controller when a process for compensating the threshold value for the detected vehicle height is initiated.

8. A method for detecting an obstacle, comprising:
detecting a vehicle height of a vehicle and transmitting detected vehicle height information;
generating a ground wave model by matching (1) a ground waveform start delay time determined based on the detected vehicle height and (2) a threshold value for the detected vehicle height;
receiving the vehicle height information in a broadcast manner;
storing the ground wave model and a ground waveform reference threshold value measured at a lowest vehicle height of the vehicle;
compensating a lowest vehicle height threshold value according to a current vehicle height using the received vehicle height information and the ground waveform start delay time;
increasing accuracy of obstacle detection by correcting the threshold value for the detected vehicle height based on the ground wave model and a final threshold value for the lowest vehicle height;
detecting an obstacle using the corrected threshold value and generating distance information of the obstacle for use by a smart parking assistance system; and
transmitting the distance information of the obstacle to a controller so as to help avoid collision with the obstacle.

9. The method of claim 8, wherein detecting the vehicle height of the vehicle comprises determining the vehicle height by counting backward a vehicle height variation that occurs according to a pressure value of an air suspension and vehicle height information set when the vehicle is released.

10. The method of claim 8, wherein generating the ground wave model comprises:
determining a starting point of a waveform reflected from a ground;
determining the ground waveform start delay time by (1) subtracting a lowest vehicle height from the current vehicle height and (2) dividing a result of the subtraction by an ultrasonic speed and a beam angle of an ultrasonic sensor; and modelling a ground wave based on a vehicle ground by determining a change to a signal magnitude according to an increase in the vehicle height when a ground waveform is measured when the vehicle is at a lowest ground height.

11. The method of claim 8, further comprising storing the ground wave model and the lowest vehicle height threshold value, wherein correcting the threshold value for the detected vehicle height comprises correcting the threshold value for the detected vehicle height using the stored lowest vehicle height threshold value, the ground wave model and vehicle height information; and wherein detecting the obstacle using the corrected threshold value comprises:

transmitting an ultrasonic wave to an obstacle; and receiving a reflected ultrasonic wave to detect the obstacle according to the corrected threshold value.

12. The method of claim 11, wherein correcting the threshold value for the detected vehicle height comprises:

determining a ground waveform start delay time by subtracting the lowest vehicle height from the current vehicle height and dividing a result of the subtraction by an ultrasonic speed and a beam angle of an ultrasonic sensor;

determining a ground signal variation by dividing a square of a lowest ground height by a square of the current vehicle height;

delaying the lowest vehicle height threshold value by the determined delay time; and determining a final threshold value of the ultrasonic sensor by multiplying the delayed lowest vehicle height threshold value by the determined ground signal variation.

13. The method of claim 12, further comprising providing the determined the final threshold value when a final threshold value is determined at the lowest vehicle height.

* * * * *